(12) United States Patent
Duffy

(10) Patent No.: US 7,377,250 B1
(45) Date of Patent: May 27, 2008

(54) SYSTEM AND METHOD FOR BALANCING AN ENGINE DURING CYLINDER CUTOUT

(75) Inventor: Kevin Patrick Duffy, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/646,840

(22) Filed: Dec. 27, 2006

(51) Int. Cl.
*F02B 75/06* (2006.01)

(52) U.S. Cl. .................. 123/192.1; 123/295; 123/198 F

(58) Field of Classification Search .............. 123/192.1, 123/198 F, 481, 295
See application file for complete search history.

(56) References Cited

U.S. PATENT DOCUMENTS

| | | | |
|---|---|---|---|
| 6,408,968 B1 | 6/2002 | Wakashiro et al. | |
| 6,662,785 B1 | 12/2003 | Sloane et al. | |
| 6,675,758 B2 | 1/2004 | Nagata et al. | |
| 6,842,673 B2 | 1/2005 | Zhang et al. | |
| 6,943,460 B2 | 9/2005 | Wakashiro et al. | |
| 7,073,488 B2 | 7/2006 | Hasler et al. | |
| 7,225,782 B2 * | 6/2007 | Pallett et al. | ............ 123/192.1 |
| 2005/0205379 A1 | 9/2005 | Tryon et al. | |
| 2006/0107919 A1 | 5/2006 | Nishi et al. | |

FOREIGN PATENT DOCUMENTS

| | | |
|---|---|---|
| JP | 09-068052 | 3/1997 |
| JP | 10-339182 | 12/1998 |

* cited by examiner

*Primary Examiner*—Stephen K. Cronin
*Assistant Examiner*—Hyder Ali
(74) *Attorney, Agent, or Firm*—Finnegan, Henderson, Farabow, Garrett & Dunner

(57) ABSTRACT

The method includes reducing output of one or more cylinders of an engine system without reducing output of the remaining cylinders of the engine system. The method also includes reducing imbalance of the engine system by supplementing the engine system with power in response to the output reduction of the one or more cylinders.

16 Claims, 2 Drawing Sheets

SYSTEM AND METHOD FOR BALANCING AN ENGINE DURING CYLINDER CUTOUT

TECHNICAL FIELD

This application relates generally to a system and method for balancing an engine during cylinder cutout, and more particularly to a control device for a hybrid engine which enables a balancing of torsional vibrations brought on by cylinder cutout.

BACKGROUND

Cylinder cutout is a method of reducing or completely stopping combustion within one or more cylinders of an engine. Cylinder cutout is used during light loading conditions to improve efficiency of the engine, or during cold conditions to raise the temperature of the operating cylinders and subsequently the rest of the engine. However, the use of cylinder cutout can cause excessive noise and vibration within the engine due to an imbalance of torsional loads, on the engine.

Previous solutions to the noise and vibration associated with cylinder cutout have included limiting the magnitude of cylinder cutout, limiting cylinder cutout to allowed geographical locations (e.g., away from residential area), and limiting cylinder cutout to particular times of the day (e.g., between 8 am and 5 pm). These solutions reduce or isolate the engine noise and vibration to comply with local noise ordinances.

U.S. Pat. No. 7,073,488 (the '488 patent), issued to Hasler et al. on Jul. 11, 2006, discloses a method of controlling operation of an engine having a plurality of cylinders. The method described in the '488 patent includes monitoring a parameter associated with engine operation, determining a range of fluctuations of the parameter from a desired parameter value, and selectively disabling operation of at least one cylinder and less than all of the plurality of cylinders in response to the range of fluctuation being greater than a predetermined threshold. Although the '488 patent discloses a method of selectively disabling one or more cylinders in response to a fluctuation, it fails to disclose a method of reducing engine vibration and noise to an acceptable level.

The presently disclosed systems and methods are directed to overcoming one or more of the problems set forth above.

SUMMARY OF THE INVENTION

In one aspect, the present disclosure is directed to a method of controlling engine balance during cylinder reductions. The method may include reducing output of one or more cylinders of an engine system without reducing output of the remaining cylinders of the engine system. The method may also include reducing imbalance of the engine system by supplementing the engine system with power in response to the output reduction of the one or more cylinders.

In another aspect, the method may include determining power demand of an engine system. The method may also include stopping fuel flow to one or more cylinders of the engine system without reducing output of the remaining cylinders of the engine system based at least in part on the determined power demand. The method may further include reducing imbalance of the engine system caused by the stopping of fuel flow by supplementing the engine system with power from an electric motor. The power from the electric motor may be delivered in synchronism with a reduced output associated with the one or more cylinders.

In yet another aspect, the present disclosure is directed to an engine system. The engine system may include an engine having a plurality of cylinders, a motor/generator operatively coupled to the engine, and a controller operatively coupled to the engine and the motor/generator. The controller may be configured to reduce output of less than all of the cylinders of the engine. The controller may be further configured to initiate the motor/generator to supplement the engine system with power in response to the output reduction.

DETAILED DESCRIPTION

Figure 1:
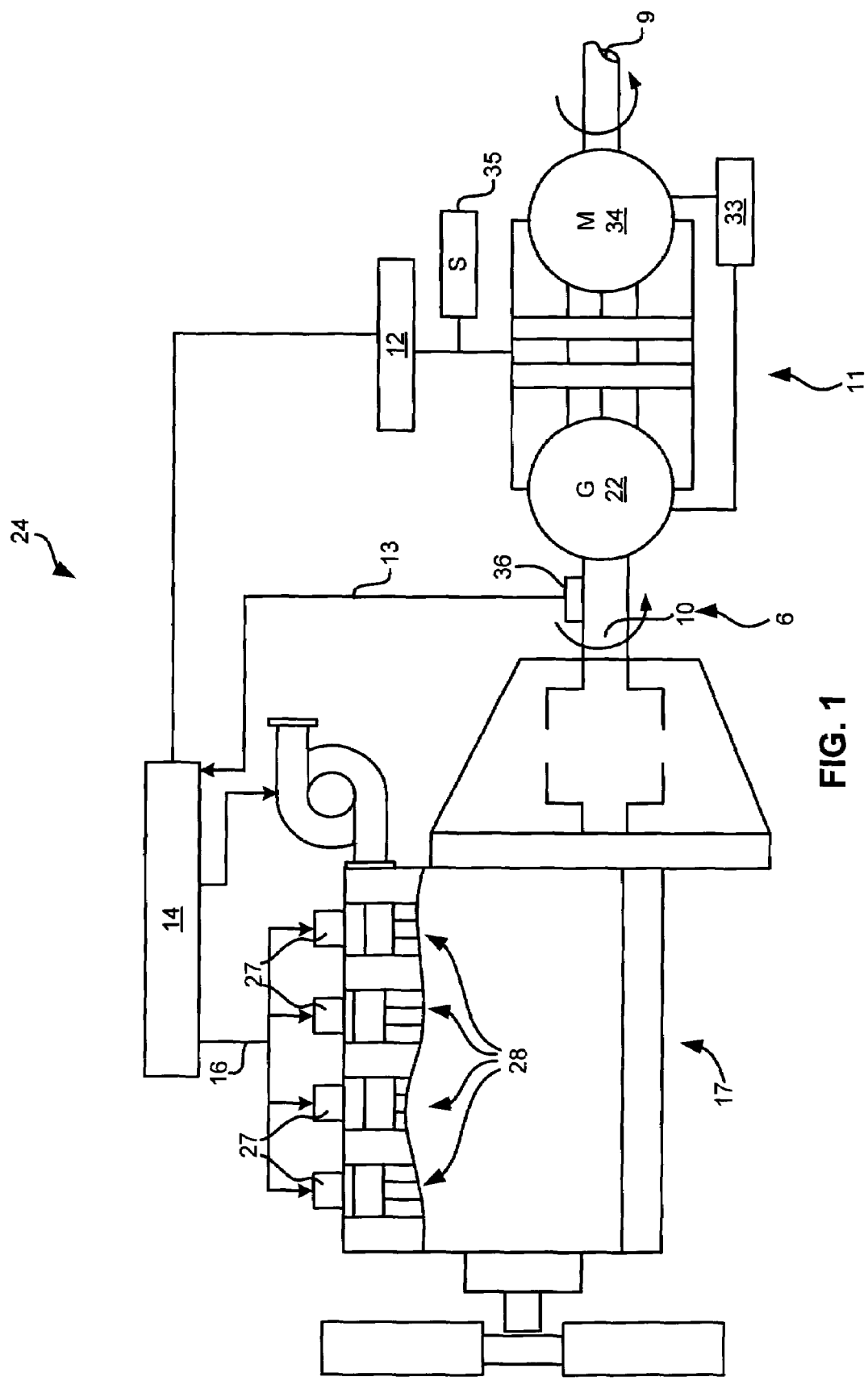
FIG. 1 is a schematic and diagrammatic representation of an exemplary embodiment of an engine balancing system for controlling engine balance during cylinder cutout in accordance with the present disclosure.

FIG. 1 illustrates an exemplary embodiment of an engine system 6 for controlling engine balance during cylinder cutout. The engine system 6 may include, for example, a power source 17 and a transmission 11. In the embodiment of FIG. 1, the power source 17 is an engine, such as a turbo aspirated internal combustion engine. The engine may be a diesel engine, a gasoline engine, a natural gas engine, or any other engine known to one skilled in the art. The engine may also be naturally aspirated, supercharged, or have any other air induction system known to one skilled in the art.

As illustrated in FIG. 1, the power source 17 may include a plurality of combustion chambers 28. A fuel injector unit 27 may be associated with each combustion chamber 28. In the illustrated embodiment, the power source 17 may include four combustion chambers 28 and four associated fuel injector units 27. One skilled in the art will readily recognize that power source 17 may include a greater or lesser number of combustion chambers 28 and that combustion chambers 28 may be disposed in an "in-line" configuration, a "V" configuration, or any other conventional configuration.

The transmission 11 may include an input drive member such as, for example, an input shaft 10, connected to power source 17. The transmission 11 may also include an output driven member such as, for example, a crankshaft/output shaft 9, connected to, for example a rear axle on a rear wheel drive vehicle. As described in greater detail below, the transmission 11 converts an input rotation of input shaft 10 into an output rotation of output shaft 9. In this manner, power generated by the power source 17 may be transmitted to the output shaft 9. Transmission 11 may be a continuously variable transmission, for example, an electronic continuously variable transmission as shown in FIG. 1.

A continuously variable transmission generally consists of a driving element, a driven element, and a ratio controller 33. In the electronic continuously variable transmission 11 illustrated in FIG. 1, the driving element is an electric generator 22 and the driven element is an electric motor 34. The electric motor 34 forms a part of a motor/generator system that is couple to a crankshaft 9 of the engine system 6. The generator 22 may be configured to convert mechanical power into electrical power, and the electric motor 34 may be configured to convert electrical power to mechanical power. The generator 22 and the electric motor 34 may be in communication via the ratio controller 33. The generator 22 and the electric motor 34 may be connected to an energy storage device 35. The energy storage device 35 may store electrical energy for later use by the motor 34. The energy storage device 35 may include, for example, any batteries and/or capacitors known to a person having ordinary skill in the art. A person skilled in the art should appreciate, that, alternatively, the electric generator 22 and the electric motor 34 may be integrated as a single unit configured to selectively operate as a motor applying torque to the power source 17, or as a generator driven by the power source 17 to produce electrical power.

The ratio controller 33 controls the ratio of the transmission output speed to the transmission input speed. In the embodiment of FIG. 1, the ratio controller 33 may be in communication with both the driving element and the driven element and may adjust the ratio of the transmission output speed to the transmission input speed, as limited by the current power output of the power source 17. When both output torque and output speed increases are demanded of the transmission 11, a demand for increased power may be transmitted to the power source 17. Likewise, when both output torque and output speed decreases are demanded of the transmission 11, a demand for decreased power is transmitted to the power source 17.

One or more sensors may be associated with the transmission 11. These sensors may be adapted to provide engine operational information such as indications as to the operation of the transmission 11. In addition, one or more sensors may be associated with the power source 17. The sensors may be adapted to provide relevant indications of the operation of the power source 17. For example, temperature sensors and pressure sensors may be provided to sense temperature and pressure within the cylinders 28 and provide signals to a power source controller 14. For another example, an engine speed sensor 36 may be provided to sense power source speed and produce a power source speed signal 13. The power source controller 14 may receive information indicative of parameters other than speed, e.g., fuel delivery information, load information, and the like, and may determine speed, power/expansion stroke timing, or other parameters from the received information.

The system for controlling engine balance during cylinder cutout may include a control system 24 having a transmission controller 12 embodied in a microprocessor and the power source controller 14 embodied in a microprocessor. Numerous commercially available microprocessors can be adapted to perform the functions of the power source and transmission controllers 14, 12. It should be appreciated that the power source and the transmission controllers 14, 12 could readily be embodied in one single controller without departing from the scope of the present disclosure. For example, the one single controller may be operatively coupled to the engine system 6 and the transmission system 11. It also should be appreciated that the ratio controller 33 may be included in the transmission controller 12.

The control system 24 may be configured to reduce output of one or more cylinders of the engine system 6 based at least in part on the engine operational information (e.g., engine power demand). The control system 24 may selectively reduce combustion of or stop combustion within the one or more cylinders of the engine system 6. At the same time, according to one embodiment of the present disclosure, the control system 24 may increase combustion of the remaining cylinders whose output are not reduced. The control system 24 may also be configured to initiate the motor 34 to supplement the engine system 6 with power at the same timing as the one or more cylinders whose output have been reduced or stopped. For example, the motor 34 may supplement the engine system 6 with power during power/expansion stroke of the one or more cylinders whose output are reduced. When the engine power demand increases, the control system 24 may control the cylinders 28 to resume normal operation, and stop the motor 34. Under the control of the control system 24, the cylinders 28 and the motor 34 may intermittingly operate based at least in part on the power demand of the power source 17 to optimize the use of energy.

In one exemplary embodiment, the power source controller 14 may be configured to receive engine operational information from the transmission controller 12 that is indicative of transmission output torque and/or power demand. The power source controller 14 may also be adapted to receive engine operational information such as, for example, power source speed signals, etc. The power source controller 14 may be configured to receive reference parameters, including fuel settings and air delivery requirements. The power source controller 14 may be further configured to process these input and reference signals and determine preparatory commands that actuate means for modifying performance characteristics of the power source 17 during a predictive time period when the change in load demand is transferred from the transmission 11 to the power source 17.

The power source controller 14 may adjust the performance of the power source 17 when the inputs received indicate that the load on the transmission has changed. The power source controller 14 may produce power source performance altering signals to increase or decrease the power output of the power source 17. In particular, the power source controller 14 may adjust the performance of a fuel injection system, an air induction system, or any other aspect of power source operation that may result in a change in the power output of the power source 17.

When adjusting the operation of the fuel injection system to vary the power output of the power source, the power source controller 14 may generate and send fuel delivery altering signals 16 to adjust the performance of the fuel injection system to control a fuel delivery rate, a fuel delivery timing, a fuel delivery pressure, and/or a fuel torque limit. These fuel delivery altering signals 16 may be produced in accordance with power source control maps such as, for example, rail pressure maps, timing maps, torque limit maps, etc., as are known in the art.

The fuel delivery altering signals 16 may be delivered to solenoids of the fuel injector units 27 associated with individual power source combustion chambers 28. The duration of the injection control signal corresponds to the on time of the solenoid, thereby controlling the duration that the fuel injector unit 27 delivers fuel to an associated combustion chamber 28 during the combustion cycle. The solenoid operated fuel injector units 27 may be hydraulically actuated units, mechanically actuated units, or any other units known in the art. The power source controller 14 may be configured to supplement in synchronism with output reduction to reduce imbalance of the engine system 6. In one exemplary embodiment, the imbalance of the engine system 6 caused by the stopping of fuel flow may be reduced by supplementing the engine system 6 with power from electric motor 34 being delivered in synchronism with a reduced output associated with the one or more cylinders.

In one exemplary embodiment, the power source controller 14 may be adapted to calculate an amount of output of the cylinders 28 to be reduced based on the load condition or the power demand information. The power source controller 14 may generate a control signal 16 to reduce combustion of or cut out one or more cylinders based on the calculated amount of output to be reduced. Cylinder reductions including reducing combustion of one or more cylinders or cut out one or more cylinders can be done, for example, by reducing or cutting off the fuel supply to those cylinders or other methods as discussed above. Cylinder cutout may reduce the fuel consumption of the power source 17, however, cylinder cutout may cause an imbalance of torsional load on the power source 17. The imbalance of the torsional load on the power source 17 may cause excessive noise and vibration within the power source 17.

One exemplary solution according to the present disclosure may include buffering the unbalanced torsional load caused by cylinder cutout with the electric motor 34. While the power source controller 14 sends a signal to stop fuel flow to one or more cylinders due to light load on the power source 17, according to one embodiment of the present disclosure, the power source controller 14 may also increase combustion of the remaining cylinders whose output are not reduced. The power source controller 14 may also send a signal to the transmission controller 12. The transmission controller 12 may determine the magnitude and timing of the cylinder cutout, and may initiate the electric motor 34 to drive the output shaft 9 in response to the cylinder cutout and in such a way that the power source 17 becomes substantially torsionally balanced. The amount of power supplemented by the electric motor 34 may be less than the power that could be generated by the cutout cylinders, but can reduce vibration and noise of the power source 17 to an acceptable level. The same technique for balancing power source torsional load can also be used in the situation where only combustion of one or more cylinders are reduced.

In one exemplary embodiment, the control system 24 may be adapted to calculate an amount of supplementary power needed to balance the torsional load of the power source 17. The calculation can be done based on the load condition or the power demand of the power source 17, and the power output of the remaining operable cylinders. For example, the supplementary power may substantially equal to the difference between the power demand and the power output of the remaining operable cylinders. For another example, the supplementary power may equal to an amount that may substantially balance torsional load of the power source 17. The control system 24 may control the motor 34 to provide power to supplement the power source 17 with the calculated amount of power.

The electric motor 34 may have a desired operating range. For the purposes of this disclosure, the term "desired operating range" includes those speeds and torques at which the electric motor 34 may experience substantially stable and efficient operation. Efficiency losses may be experienced by the electric motor 34 when operating outside the desired operating range such as, for example, increased energy consumption, increased temperature, and/or decreased responsiveness. The transmission controller 12 may determine the desired operating range of the electric motor 34 based on the magnitude of the cylinder cutout and/or characteristics of the electric motor 34, and may operate the electric motor 34 within the desired operating range.

INDUSTRIAL APPLICABILITY

The disclosed control system for controlling engine balance during cylinder cutout may be used with any diesel, gasoline, natural gas, and/or other combustion engines, or power sources know in the art. The disclosed control system may stop fuel flow to one or more cylinders based on a desired load on the transmission (engine power demand information), and reduce the noise and imbalance caused within the power source. The operation of the disclosed control system will now be explained.

Figure 2:
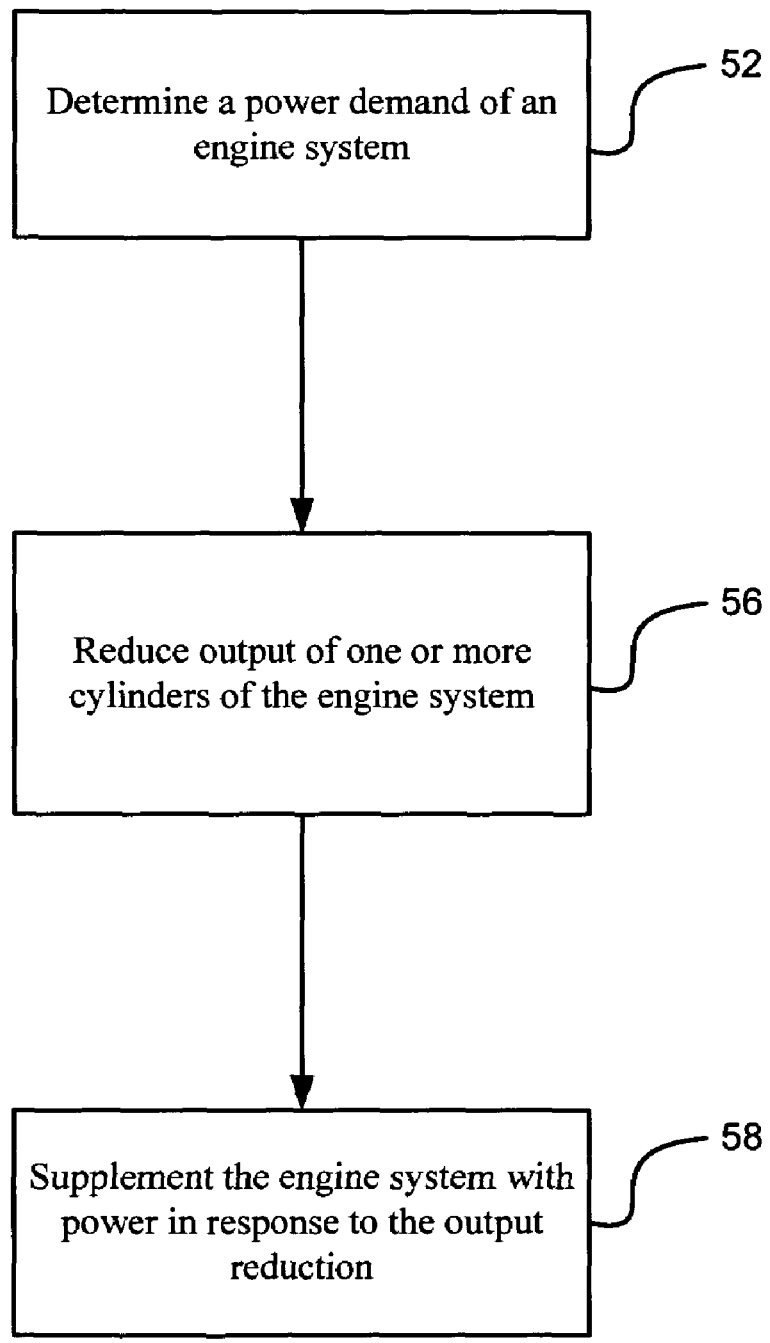
FIG. 2 is a flow chart illustrating an exemplary method of balancing an engine system in accordance with the present disclosure.

A flow chart illustrating an exemplary method 50 for controlling engine balance during cylinder cutout is shown in FIG. 2. At step 52, the power source controller 14 may determine a power demand of the engine system. The power source controller 14 may receive a desired load signal, the speed signal, a torque signal and/or other signals, and determine the power demand based on one or more of those signals. Alternatively, the power source controller 14 may receive a power demand signal from other systems, for example, the transmission controller 12.

At step 56, the power source controller 14 may modify performance characteristics of the power source 17, for example, by selectively reducing output of one or more cylinders of the power source 17. The power source controller 14 may modify the fuel injection system to increase or decrease the power output of the power source 17. The power source controller 14 may send a signal to the transmission controller 12, which may initiate the electric motor 34 to drive the output shaft 9 in response to the cylinder output reduction and in such a way that the power source 17 becomes substantially torsionally balanced (step 58). The electric motor 34 may be operated to provide power to supplement the power source 17 with power in response to the output reduction of the one or more cylinders. In one embodiment, the motor 34 may supplement the engine system 6 with power during expansion stroke of the one or more cylinders whose output are reduced. The supplementary power generated by the electric motor 34 may help to balance the power source 17, and thereby to reduce noise and vibration of the power source 17. The supplementary power provided by the electric motor 34 may be the lesser of (i) the power decrease caused by the reduction in output, and (ii) designated operating parameters of the electric motor 34. In one embodiment, the control system 24 may calculate the amount of power needed to balance the torsional load of the engine system based on the power generated by the previously operable cylinders. In another embodiment, the calculation may be further based on the power demand. In some exemplary embodiments, the engine system 6 may be operated in an HCCI type cycle.

The disclosed control system may provide several advantages over other simulation based systems. For example, this system provides the capability to buffer the torsional vibration caused by cylinder cutout with an electric motor. Specifically, in a hybrid application (combustion engine coupled to electric drive), the motor/generator can be operated to supplement the engine with power in response to the output reduction of the one or more cylinders. The motor/generator can provide power to supplement the engine with power during expansion stroke of the one or more cylinders whose output are reduced. The amount of power may be less than previously operable cylinders, but still enough to reduce vibration and noise to an acceptable level. The disclosed control system and method for controlling engine balancing during cylinder reductions are especially useful in HCCI-type internal combustion engines where stable operation is important.

It will be apparent to those skilled in the art that various modifications and variations can be made to the disclosed control system for controlling engine balance during cylinder cutout without departing from the scope of the invention.

Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method of controlling engine balance during cylinder reductions, comprising:

reducing output of one or more cylinders of an engine system without reducing output of the remaining cylinders of the engine system; and reducing imbalance of the engine system by supplementing the engine system with power in response to the output reduction of the one or more cylinders, wherein the supplementing of the engine system includes providing power from an electric motor and an amount of power provided by the electric motor is the lesser of (i) the power decrease caused by the reduction in output and (ii) designated operating parameters of the electric motor.

2. The method of claim 1, wherein the supplementing of the engine system with power includes supplementing the engine system with power during the expansion stroke of the one or more reduced output cylinders.

3. The method of claim 1, wherein the reducing of the output of one or more cylinders includes stopping a flow of fuel to the one or more cylinders.

4. The method of claim 1, wherein the reducing of the output of the one or more cylinders includes determining an amount of power to be reduced based on engine operational information, and reducing output of the one or more cylinders based on the determined amount.

5. The method of claim 1, wherein the reducing of the output of the one or more cylinders without reducing the output of the remaining cylinders includes increasing the output of the remaining cylinders.

6. The method of claim 1, further including operating the engine system in a homogeneous charge compression ignition (HCCI) type cycle.

7. The method of claim 1, wherein the engine system includes a motor/generator system coupled to a crankshaft of the engine system, and the supplementing of the engine with power includes providing power from the motor/generator system.

8. A method of controlling engine balance during cylinder reductions, comprising:

determining power demand of an engine system;

stopping fuel flow to one or more cylinders of the engine system without reducing output of the remaining cylinders of the engine system based at least in part on the determined power demand; and reducing imbalance of the engine system caused by the stopping of fuel flow by supplementing the engine system with power from an electric motor, the power from the electric motor being delivered in synchronism with a reduced output associated with the one or more cylinders, wherein an amount of power provided by the electric motor is the lesser of (i) the power decrease caused by the reduction in output and (ii) designated operating parameters of the electric motor.

9. The method of claim 8, wherein the reducing of the output of the one or more cylinders without reducing the output of the remaining cylinders includes increasing the output of the remaining cylinders.

10. The method of claim 8, wherein the electric motor forms a part of a motor/generator system that is coupled to a crankshaft of the engine system.

11. The method of claim 10, wherein the supplementing of the engine system with power from the electric motor includes driving the electric motor with energy stored from conversion of engine system power by the generator.

12. The method of claim 8, further including operating the engine system in a homogeneous charge compression ignition (HCCI) type cycle.

13. An engine system, comprising:

an engine having a plurality of cylinders;

a motor/generator operatively coupled to the engine; and a controller operatively coupled to the engine and the motor/generator, the controller being configured to reduce output of less than all of the cylinders of the engine, and being configured to initiate the motor/generator to supplement the engine system with power in response to the output reduction, wherein an amount of power provided by the motor/generator is the lesser of (i) the power decrease caused by the reduction in output and (ii) designated operating parameters of the motor/generator.

14. The engine system of claim 13, wherein the controller being configured to reduce output of less than all of the cylinders of the engine includes stopping fuel flow to one or more cylinders and increase fuel flow to the remaining cylinders.

15. The engine system of claim 14, wherein the controller is configured to supplement in synchronism with output reduction to reduce torsional imbalance.

16. The engine system of claim 13, wherein the engine system is operated in a homogeneous charge compression ignition (HCCI) type cycle.

* * * * *